(12) United States Patent
Choi

(10) Patent No.: US 11,072,228 B2
(45) Date of Patent: Jul. 27, 2021

(54) SEALING STRUCTURE FOR VEHICLE DOOR

(71) Applicants: Hyundai Motor Company, Seoul (KR); Kia Motors Corporation, Seoul (KR)

(72) Inventor: Je-Won Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 41 days.

(21) Appl. No.: 16/661,532

(22) Filed: Oct. 23, 2019

(65) Prior Publication Data

US 2020/0238805 A1 Jul. 30, 2020

(30) Foreign Application Priority Data

Jan. 24, 2019 (KR) .................. 10-2019-0009449

(51) Int. Cl.
  *E05F 11/00* (2006.01)
  *B60J 10/84* (2016.01)
  *B60J 10/33* (2016.01)

(52) U.S. Cl.
  CPC .............. *B60J 10/84* (2016.02); *B60J 10/33* (2016.02)

(58) Field of Classification Search
  CPC ... B60J 10/84; B60J 10/33; B60J 10/86; B60J 10/20
  USPC ........................... 49/495.1, 498.1, 490.1, 360
  See application file for complete search history.

(56) References Cited

U.S. PATENT DOCUMENTS

| 5,024,480 | A * | 6/1991 | Petrelli | B62D 25/07 296/146.9 |
| 6,328,374 | B1 * | 12/2001 | Patel | B60J 5/06 296/155 |
| 6,487,819 | B1 * | 12/2002 | Goldberg | B60J 10/24 49/475.1 |
| 6,971,706 | B2 * | 12/2005 | Yoshida | B60J 5/06 296/146.16 |
| 7,399,023 | B2 * | 7/2008 | Nomura | B60J 5/06 296/146.1 |
| 8,070,102 | B2 * | 12/2011 | Kobayashi | E05D 15/1042 244/129.5 |
| 8,234,816 | B2 * | 8/2012 | Heuel | E05D 15/58 49/216 |

(Continued)

FOREIGN PATENT DOCUMENTS

KR      10-137488      3/2014

*Primary Examiner* — Jerry E Redman
(74) *Attorney, Agent, or Firm* — Mintz Levin Cohn Ferris Glovsky and Popeo, P.C.; Peter F. Corless

(57) ABSTRACT

A sealing structure for a vehicle door seals a gap between a door and body of the vehicle and includes a sealed portion as a gap between the body and a door inner pane. A body weather strip is mounted at a first side of a lateral most portion of the sealed portion along a rim of an opening portion of the body and seals the gap between the body and door. An upper weather strip is mounted at a second side of the lateral most portion of the sealed portion along a roof panel and seals gaps between the roof panel, body, and door. A door weather strip is mounted in the sealed portion between the body and upper weather strips to be spaced apart from the body and upper weather strips, extends along the rim of the opening portion, and seals the gap between the body and door.

6 Claims, 4 Drawing Sheets

(56) References Cited

U.S. PATENT DOCUMENTS

| | | | | |
|---|---|---|---|---|
| 8,567,126 B2* | 10/2013 | Hozumi | ............ | B60J 5/06 49/360 |
| 8,844,197 B2* | 9/2014 | Heuel | ............ | E05D 15/101 49/216 |
| 2001/0006298 A1* | 7/2001 | Tsubokura | ............ | B60J 5/06 296/155 |
| 2005/0279025 A1* | 12/2005 | Suzuki | ............ | E05D 15/101 49/360 |
| 2017/0342767 A1* | 11/2017 | Sakakibara | ............ | B60J 10/86 |
| 2020/0215893 A1* | 7/2020 | Choi | ............ | B60J 10/36 |
| 2020/0223295 A1* | 7/2020 | Matsumoto | ............ | B60J 5/06 |
| 2020/0300018 A1* | 9/2020 | Kamitani | ............ | E05F 15/44 |

* cited by examiner

SECT A-A

SECT B-B

SECT A-A

SECT B-B

SEALING STRUCTURE FOR VEHICLE DOOR

CROSS-REFERENCE TO RELATED APPLICATIONS

This application claims priority under 35 U.S.C. § 119 to Korean Patent Application No. 10-2019-0009449, filed on Jan. 24, 2019, the disclosure of which is incorporated herein by reference in its entirety.

BACKGROUND

1. Field of the Invention

The present invention relates to a sealing structure for a vehicle door, and more particularly, to a sealing structure for a vehicle door, in which in opposite sliding doors, a center roller is mounted on a vehicle body, and a center rail is mounted on a door, to seal a portion where the center roller operates, omit an upper roller and an upper rail, and mount a door weather strip at a sealed portion, to securely seal a gap between the door and the vehicle body.

2. Description of the Related Art

In general, doors for opening and closing an occupant compartment of a vehicle include front doors which are installed at a front side in a longitudinal direction of a vehicle, and rear doors which are installed at a rear side in the longitudinal direction of the vehicle. Recently, a necessity of completely opening a door to allow a disabled person to be seated in the vehicle and facilitate loading has increased, and as a result, sliding doors, which are opened or closed by being pushed laterally, are being installed.

Both the rear door and the front door are being configured as a sliding door, such that the rear door and the front door may be opened in opposite directions. Accordingly, an upper rail, a center rail, and a lower rail are mounted at an upper side, a middle side, and a lower side of a vehicle body, respectively, and an upper roller, a center roller, and a lower roller are mounted at an upper side, a middle side, and a lower side of the door, respectively, to correspond to the upper rail, the center rail, and the lower rail, respectively, thereby allowing the door to slide.

Meanwhile, in the vehicle, a weather strip, which functions as a sealing member, is installed on the vehicle body to seal a portion between an opening edge portion of each vehicle body opening portion (e.g., a side door opening portion, a back door opening portion, a trunk opening portion, etc.) and a circumferential edge portion of each door body (e.g., a side door, a back door, a trunk lid, etc.) that may close the vehicle body opening portion.

Regarding a weather strip of a vehicle mounted with sliding doors, a developed technique discloses a sliding door apparatus for a vehicle that moves forward and rearward in a longitudinal direction of the vehicle to open and close a door opening of a vehicle body. The sliding door apparatus for a vehicle includes a sliding door which is slidably installed, a door weather strip which is attached to the sliding door, a pressure switch which detects an internal pressure of the door weather strip, and a pneumatic pressure line which connects the door weather strip and the pressure switch so that the door weather strip and the pressure switch are in communication with each other.

However, with this technique, sealability of the weather strip deteriorates since a shape of the opening flange is changed as the front door is configured as the sliding door, and a shape of the weather strip is changed to correspond to the changed shape of the opening flange. Accordingly, a structure for mounting a weather strip on the sliding doors, which are mounted in an opposite manner, is illustrated in FIG. 1 according to the related art.

Referring to FIG. 1A, weather strips for a vehicle, in which the sliding doors in the related art are mounted, include an upper weather strip 5 which is mounted in a gap between a roof panel and a vehicle body 1 to seal the gap between the roof panel and the vehicle body 1 of the vehicle, and a body weather strip 7 which is mounted along a rim of an opening flange portion to seal a gap between the vehicle body 1 and a door.

However, referring to FIG. 1B, the body weather strip 7 is mounted between the vehicle body 1 and a door 2. Accordingly, it is impossible to seal a gap between the vehicle body 1 and the door 2 in an operating section A' where a center rail 3, which is mounted on the vehicle body 1 to allow the door 2 to slide, and a center roller 4, which is mounted on the door 2 to correspond to the center rail 3, are operated.

Referring to FIG. 1C, the upper weather strip 5 is mounted among the roof panel, the vehicle body 1, and the door 2. An upper rail 6 is mounted at an upper side of the vehicle body 1 to allow an operation of the sliding door. However, it is impossible to seal gaps among the vehicle body 1, the door 2, and the roof panel in an operating section of an upper roller which is indicated by B'.

SUMMARY

The present invention provides a sealing structure for a vehicle door, in which a center roller may be mounted on a vehicle body, and a center rail may be mounted on a door to seal a portion where the center roller operates, an upper roller and an upper rail may be omitted, and a door weather strip may be mounted at a sealed portion to thus securely seal a gap between the door and the vehicle body.

An exemplary embodiment of the present invention provides a sealing structure for a vehicle door which seals a gap between a door and a vehicle body of the vehicle. The sealing structure may include: a sealed portion which is a gap between the vehicle body and a door inner panel; a body weather strip mounted at a first side of a lateral most portion of the sealed portion along a rim of an opening portion of the vehicle body and seals the gap between the vehicle body and the door; an upper weather strip mounted at a second side of the lateral most portion of the sealed portion along a roof panel and seals gaps among the roof panel, the vehicle body, and the door; and a door weather strip mounted in the sealed portion between the body weather strip and the upper weather strip to be spaced apart from the body weather strip and the upper weather strip, extends along the rim of the opening portion, and seals the gap between the vehicle body and the door.

The sealing structure may further include: a center rail mounted at a center inside the door in a front-rear direction of the vehicle; and a center roller which is mounted on the vehicle body to correspond to the center rail and coupled to the center rail to allow the door to slide. A neck portion of the center roller may be bent toward the center rail to mount the body weather strip in the sealed portion. The center rail may be mounted in a curved manner on the door to allow the door to move toward the outside of the interior of the vehicle when opening the door. The center roller may be accommodated in an aperture formed in the door inner panel when the center roller is coupled to the center rail and the door is closed. A door bulkhead bracket having a recessed shape may be mounted on the door inner panel to close the aperture and accommodate the center roller.

According to the present invention having the above-mentioned configuration, the center roller may be mounted on the vehicle body, the center rail may be mounted on the door, and the center roller may have a gooseneck shape to seal the gap between the vehicle body and the door even in the operating section of the center roller. Additionally, an upper roller and an upper rail may be omitted, and the vehicle body is configured to have a closed cross section at a lower side of the roof panel, to securely seal the gaps among the roof panel, the vehicle body, and door at the lower side of the roof panel. The door weather strip may be mounted between the body weather strip and the upper weather strip, and the gap between the vehicle body and the door may be triply sealed to thus improve sealability.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1A:
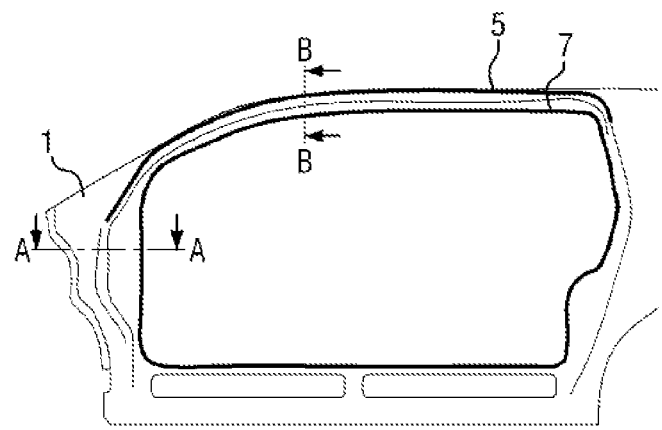
FIG. 1A is a view illustrating a structure for mounting a weather strip for a vehicle in which sliding doors in the related art are mounted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings. However, the present invention is not restricted or limited by exemplary embodiments. Like reference numerals indicated in the respective drawings refer to members which perform substantially the same functions.

Figure 2A:
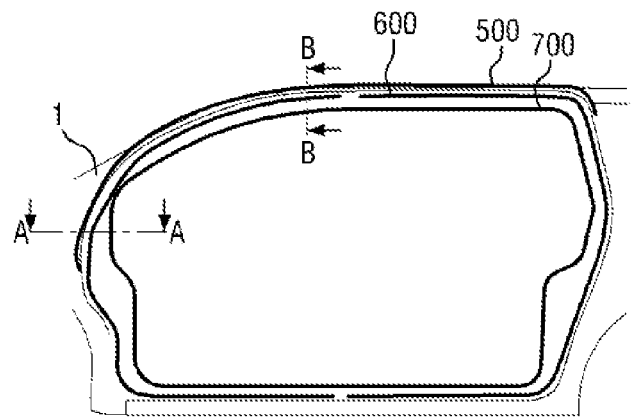
FIG. 2A is a view illustrating a sealing structure for a vehicle door according to an exemplary embodiment of the present invention.

FIG. 2A is a view illustrating a triple sealing structure for opposite sliding doors 2 according to the present invention. The triple sealing structure for the opposite sliding doors 2 according to the present invention may be applied to a vehicle in which a front door and a rear door are opened or closed while sliding in opposite directions. Referring to FIG. 2A, the triple sealing structure for the opposite sliding doors 2 according to the present invention may include a body weather strip 70, an upper weather strip 50, and a door weather strip 60 and may triply seal a vehicle body 1 and the door 2.

Figure 1B:
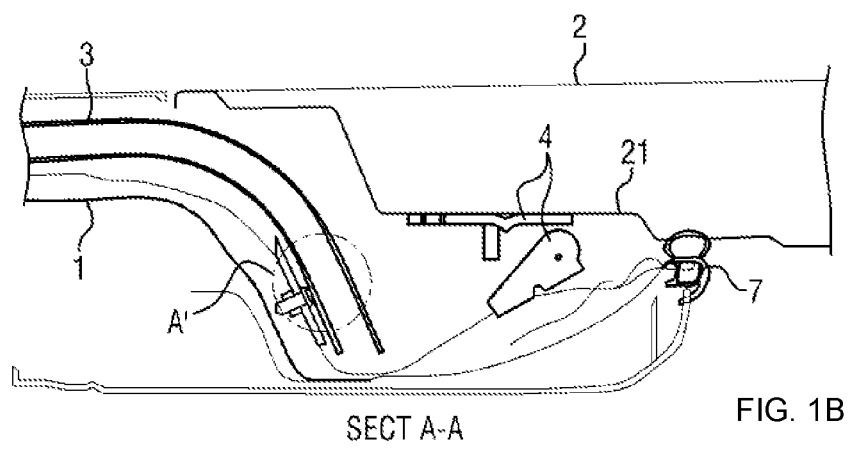
FIG. 1B is a view illustrating section A-A in FIG. 1A according to the related art.
Figure 1C:
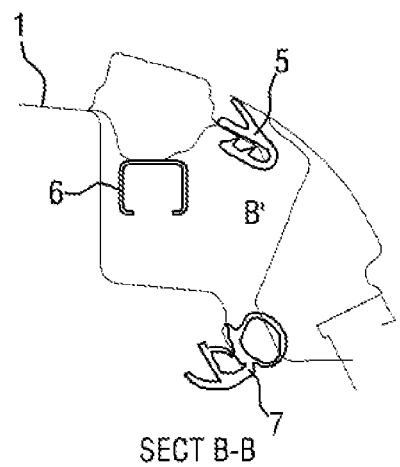
FIG. 1C is a view illustrating section B-B in FIG. 1A according to the related art.

In particular, the body weather strip 70, the upper weather strip 50, and the door weather strip 60 may be mounted in a sealed portion (see FIG. 1B) which is a gap between the vehicle body 1 and a door inner panel 21. The body weather strip 70, the upper weather strip 50, and the door weather strip 60 may seal the portion between the vehicle body 1 and the door inner panel 21 to prevent wind, water, and the like from penetrating into the interior of the vehicle. The body weather strip 70 may be mounted at a first side of a lateral most portion of the sealed portion along a rim of an opening portion of the vehicle body 1 and may seal the gap between the vehicle body 1 and the door 2.

The upper weather strip 50 may be mounted at a second side of the lateral most portion of the sealed portion along a roof panel and may seal gaps among the roof panel, the vehicle body 1, and the door 2. The door weather strip 60 may be mounted in the sealed portion between the body weather strip 70 and the upper weather strip 50 to be spaced apart from the body weather strip 70 and the upper weather strip 50, extends along the rim of the opening portion, and may seal the gap between the vehicle body 1 and the door 2.

Figure 3:
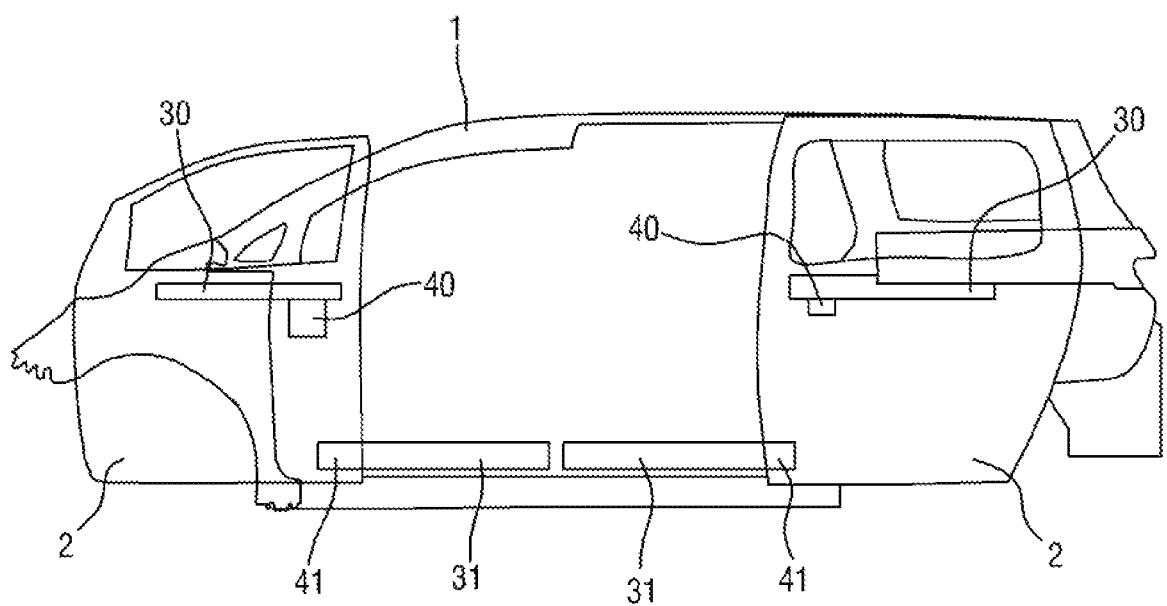
FIG. 3 is a view illustrating a state in which a center rail and a lower roller are mounted on a door and a center roller and a lower rail are mounted on a vehicle body in accordance with an exemplary embodiment of the present invention.

FIG. 3 illustrates a state in which a center rail 30 and a lower roller 41 are mounted on the door 2 and a center roller 40 and a lower rail 31 are mounted on the vehicle body 1 in accordance with the present invention. Referring to FIG. 3, the present invention may further include the center rail 30, the center roller 40, the lower rail 31, and the lower roller 41.

The center rail 30 may be mounted at a center inside the door 2 in a front-rear direction of the vehicle. In particular, the center rail 30 may be mounted inside the door 2 unlike a center rail 30 in the related art, and as a result, the center rail 30 may not be exposed to the outside even though the door 2 of the vehicle is closed. The center rail 30 may be mounted in a curved manner on the door 2 to allow the door 2 to move toward the outside of the interior of the vehicle when opening the door 2.

Additionally, the center roller 40 may be mounted on and fixed to the vehicle body 1 at a position that corresponds to the center rail 30 to couple the center roller 40 to the center rail 30, and the center rail 30 enables the center roller 40 to move when opening or closing the door 2. In other words, the center roller 40 may be fixed to the vehicle body 1 when opening or closing the door 2, but the center roller 40 may be moved relative to the center rail 30 as the center rail 30 moves.

The lower rail 31 may be mounted in the front-rear direction of the vehicle at a lower side of the vehicle body 1, and the lower roller 41 may be mounted on the door 2 to correspond to the lower rail 31. When opening or closing the door 2, the lower roller 41 may move along the lower rail 31 to enable the door 2 to slide.

Figure 2B:
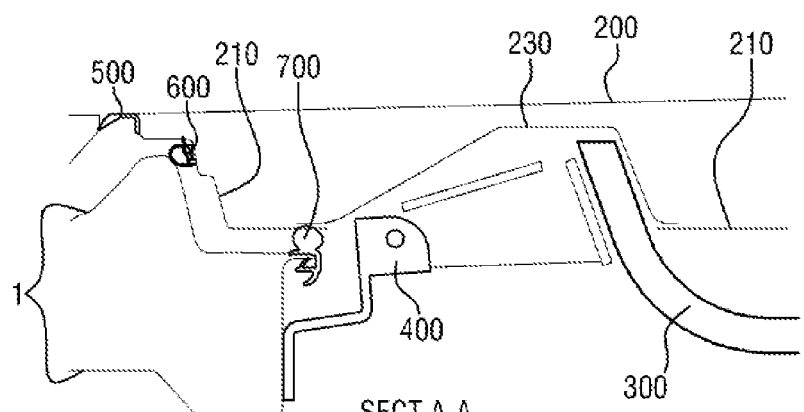
FIG. 2B is a view illustrating section A-A in FIG. 2A according to an exemplary embodiment of the present invention.

FIG. 2B is a view illustrating section A-A in FIG. 2A. Referring to FIG. 2B, unlike a sealing structure in the related art, the triple sealing structure for the opposite sliding doors 2 according to the present invention may include the body weather strip 70, the upper weather strip 50, and the door weather strip 60, thereby triply sealing the sealed portion.

Figure 4A:
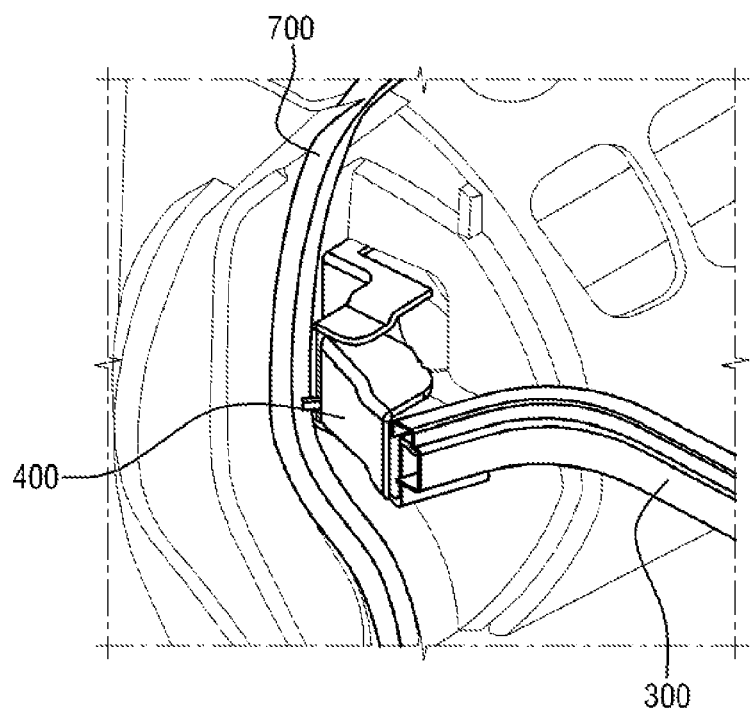
FIG. 4A is a view illustrating a state in which the center roller is mounted on the vehicle body in accordance with an exemplary embodiment of the present invention.

In particular, referring to FIG. 4A, a neck portion 43 of the center roller 40 may be bent toward the center rail 30 and then mounted on the vehicle body 1 to mount the body weather strip 70 in the sealed portion. As described above, the center rail 30 may be mounted on the door 2, the center roller 40 may be mounted on the vehicle body 1, and the neck portion 43 of the center roller 40 may be bent, and as a result, the triple sealing structure may be continuously formed in the sealed portion even in the vicinity of the mounting portion of the center roller 40. In addition, the center roller 40 may be mounted on the vehicle body 1 to form a space of the sealed portion, and an aperture may be formed in the door inner panel 21 to couple the center roller 40 \to the center rail 30, the end of which is mounted in a curved manner.

Figure 2C:
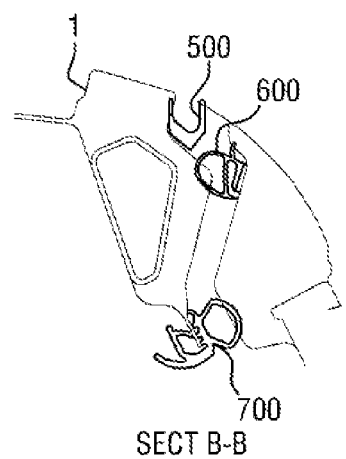
FIG. 2C is a view illustrating section B-B in FIG. 2A according to an exemplary embodiment of the present invention.
Figure 4B:
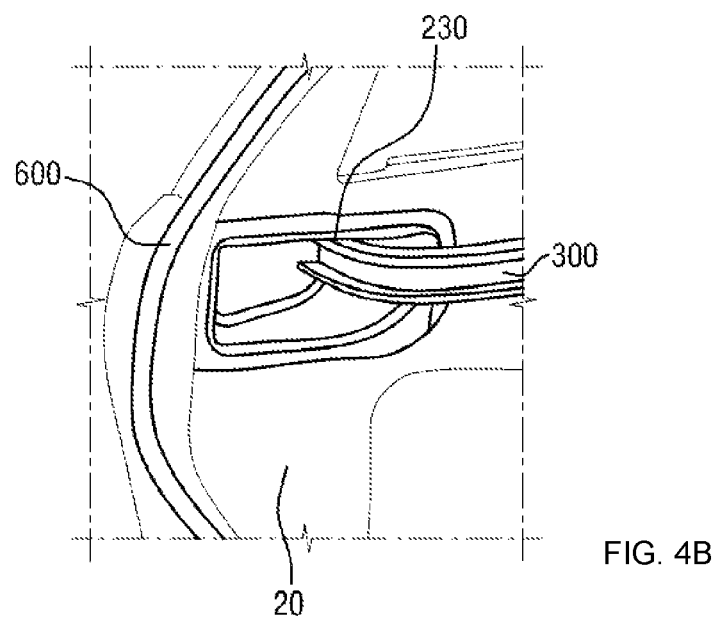
FIG. 4B is a view illustrating a state in which a door bulkhead bracket and the center rail are mounted on the door in accordance with an exemplary embodiment of the present invention.

Referring to FIG. 4B, when the door 2 is closed, the center roller 40 may be accommodated in the aperture formed in the door inner panel 21 when the center roller 40 is coupled to the center rail 30. A door bulkhead bracket 23 having a recessed shape may be mounted on the door inner panel 21 to close the aperture and accommodate the center roller 40. FIG. 2C is a view illustrating section B-B in FIG. 2A.

Referring to FIG. 2C, according to the present invention, an upper rail and an upper roller in the related art may be omitted, and as a result, it may be possible to seal operating spaces of the upper rail and the upper roller in the related art. The upper rail and the upper roller may be omitted, and the door 2 may slide using the center rail 30, the center roller 40, the lower rail 31, and the lower roller 41, and as a result, the vehicle body 1 may have a closed cross section at a lower side of the roof panel. Since the upper rail is not mounted, the sealed portion, where the door 2 and the vehicle body 1 are sealed, may be continuously formed at the lower side of the roof panel, and the triple sealing structure according to the present invention, which includes the body weather strip 70, the upper weather strip 50, and the door weather strip 60, may be mounted in the sealed portion.

An object and an effect of the present invention may be naturally understood or may become clearer from the following description, and the object and the effect of the present invention are not restricted only by the following description. In addition, in the description of the present invention, the specific descriptions of publicly known technologies related with the present invention will be omitted when it is determined that the specific descriptions may unnecessarily obscure the subject matter of the present invention.

What is claimed is:

1. A sealing structure for a vehicle door comprising:
   a sealed portion which is a gap between a vehicle body and a door inner panel;
   a body weather strip mounted at a first side of a lateral portion of the sealed portion between a rim of an opening portion of the vehicle body and that seals the gap between the vehicle body and the door;
   an upper weather strip mounted at a second side of the lateral portion of the sealed portion along a roof panel and that seals additional gaps between the roof panel, the vehicle body, and the door;
   a door weather strip mounted in the gap of the sealed portion between the body weather strip and the upper weather strip to be spaced apart from the body weather strip and the upper weather strip, that extends along the rim of the opening portion, and that seals the gap between the vehicle body and the door;
   a center rail mounted at a center inside the door in a front-rear direction of the vehicle; and
   a center roller mounted on the vehicle body to correspond to the center rail and coupled to the center rail to allow the door to slide,
   wherein the upper weather strip, the door weather strip, and the body weather strip are formed in a front of the center roller coupled to the center rail mounted on the door that opens forward, and when the door is opened forward, the gap between the vehicle body and the door is sealed by the upper weather strip, the door weather strip, and the body weather strip.

2. The sealing structure of claim 1, wherein a neck portion of the center roller is bent toward the center rail to mount the body weather strip into the gap of the sealed portion.

3. The sealing structure of claim 1, wherein the center rail is mounted in a curved manner on the door to allow the door to move toward an outside of an interior of the vehicle when opening the door.

4. The sealing structure of claim 1, wherein the center roller is accommodated in an aperture formed in the door inner panel in a state in which the center roller is coupled to the center rail when the door is closed.

5. The sealing structure of claim 4, wherein a door bulkhead bracket having a recessed shape is mounted on the door inner panel to close the aperture and accommodate the center roller.

6. A vehicle having the sealing structure for the vehicle door according to claim 1.

* * * * *